United States Patent
Joo (10) Patent No.: US 9,247,481 B2
(45) Date of Patent: Jan. 26, 2016

(54) ROUTING DEVICE AND METHOD

(71) Applicant: Electronics and Telecommunications Research Institute, Daejeon (KR)

(72) Inventor: Seong-Soon Joo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 61 days.

(21) Appl. No.: 14/171,091

(22) Filed: Feb. 3, 2014

(65) Prior Publication Data

US 2014/0219168 A1      Aug. 7, 2014

(30) Foreign Application Priority Data

Feb. 4, 2013   (KR) .......................... 10-2013-0012449
Jan. 8, 2014   (KR) .......................... 10-2014-0002530

(51) Int. Cl.
*H04W 40/24* (2009.01)
*H04L 12/715* (2013.01)
*H04W 84/20* (2009.01)

(52) U.S. Cl.
CPC ............. *H04W 40/246* (2013.01); *H04L 45/46* (2013.01); *H04W 84/20* (2013.01); *Y02B 60/50* (2013.01)

(58) Field of Classification Search
CPC ..... H04W 40/246; H04W 84/20; H04L 45/46
USPC ................................... 370/312, 252, 336, 328
See application file for complete search history.

(56) References Cited

U.S. PATENT DOCUMENTS

| | | | | |
|---|---|---|---|---|
| 2010/0189082 A1* | 7/2010 | Choi et al. | ..................... | 370/336 |
| 2010/0296493 A1* | 11/2010 | Lee et al. | ..................... | 370/336 |
| 2012/0069869 A1* | 3/2012 | Jeong et al. | .................... | 375/132 |
| 2012/0093056 A1* | 4/2012 | Shin et al. | ..................... | 370/312 |
| 2012/0134280 A1* | 5/2012 | Rotvold et al. | ............... | 370/252 |
| 2012/0320881 A1* | 12/2012 | Hong et al. | .................... | 370/336 |

FOREIGN PATENT DOCUMENTS

KR      1020100053428 A      5/2010

* cited by examiner

*Primary Examiner* — Kwang B Yao
*Assistant Examiner* — Syed M Bokhari
(74) *Attorney, Agent, or Firm* — William Park & Associates Ltd.

(57) ABSTRACT

Disclosed herein are provided a routing device and method for configuring a Low Power Wireless Mesh Network (LP-WMN) including a channel hopping time multiplexing wireless link. The routing device includes a control unit and a communication unit. The control unit sets up a virtual link, a shared link, or a dedicated link to an external device or router. The communication unit forwards a data frame to the device or router based on the set-up link.

14 Claims, 8 Drawing Sheets

ROUTING DEVICE AND METHOD

CROSS REFERENCE TO RELATED APPLICATIONS

This application claims the benefit of Korean Patent Application Nos. 10-2013-0012449 and 10-2014-0002530, filed Feb. 4, 2013 and Jan. 8, 2014, which are hereby incorporated by reference in their entirety into this application.

BACKGROUND OF THE INVENTION

1. Technical Field

The present invention relates generally to a routing device and method and, more particularly, to a routing device and method for a low power wireless network.

2. Description of the Related Art

With the development of low power wireless communication technology, wireless communication functionality can be provided to everyday electronic devices, and accordingly the number of devices connected to the Internet is increasing.

Conventional low power wireless communication technology aims at wirelessly connecting devices, such as a disposable sensor and a toy, with low communication reliability and at low cost.

At present, it is necessary to configure a wireless network using low power with high communication reliability, as in industrial equipment or medical equipment. In particular, there is an increasing demand for a device and method for configuring a wireless network having constant point-to-point transfer delay using low power.

SUMMARY OF THE INVENTION

Accordingly, the present invention has been made keeping in mind the above problems occurring in the prior art, and an object of the present invention is to provide a low power wireless communication network routing device and method.

In accordance with an aspect of the present invention, there is provided a routing device for configuring a Low Power Wireless Mesh Network (LPWMN) including a channel hopping time multiplexing wireless link, the routing device including a control unit configured to set up a virtual link, a shared link, or a dedicated link to an external device or router; and a communication unit configured to forward a data frame to the device or router based on the set-up link.

The virtual link, the shared link, or the dedicated link may include superframes whose Beacon Interval (BI) between beacons has a contention access period (GAP) and a guaranteed time slot (GTS), and one or more multi-superframes may be included in the BI.

If the virtual link is set up, the control unit may relay a routed transport frame instead of forwarding the routed transport frame.

The control unit may operate based on a DSME MAC Link Control sublayer (DLC) and a DSME MAC Link Network sublayer (DLN).

The control unit may perform link connection control, link management service, and data transmission on a link based on the DLC.

The control unit may configure the shared link and the dedicated link based on the DLC.

The DLN comprises a link network formation block, an addressing block, a routing block, a link network management block, and a data processing block.

The control unit may be assigned an address by a higher router based on the DLN, and may select a routing path of the virtual link, the shared link, or the dedicated link.

The routing device may further include a cluster unit configured to collect cluster configuration information, intra-cluster mesh link information and inter-cluster mesh link information and to send the collected information to the control unit.

The control unit may determine routing based on the intra-cluster mesh link information and the inter-cluster mesh link information.

In accordance with an aspect of the present invention, there is provided a routing method for configuring an LPWMN including a channel hopping time multiplexing wireless link, the routing method including setting up, by a control unit, a virtual link, a shared link, or a dedicated link to an external device or router; and forwarding, by a communication unit, a data frame to the device or router based on the set-up link.

The virtual link, the shared link, or the dedicated link may include superframes whose BI between beacons has a GAP and a GTS, and one or more multi-superframes may be included in the BI.

The routing method may further include, if the virtual link is set up, relaying, by the control unit, a routed transport frame instead of forwarding the routed transport frame.

The control unit may operate based on a DLC and a DLN.

The control unit may perform link connection control, link management service, and data transmission on a link based on the DLC.

The control unit may configure the shared link and the dedicated link based on the DLC.

The DLN may include a link network formation block, an addressing block, a routing block, a link network management block, and a data processing block.

The control unit may be assigned an address by a higher router based on the DLN, and the control unit may set a routing path of the virtual link and set a routing path of the shared link and the dedicated link.

The routing method may further include collecting, by a cluster unit, cluster configuration information, intra-cluster mesh link information, and inter-cluster mesh link information, and sending, by the cluster unit, the collected information to the control unit.

The control unit may determine routing based on the intra-cluster mesh link information and the inter-cluster mesh link information.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

In order to describe the present invention in detail so that those having ordinary knowledge in the technical field to which the present invention pertains can readily practice the technical spirit of the present invention, preferred embodiments of the present invention will be described below with reference to the accompanying drawings. It should be noted that the same reference numerals are used throughout the different drawings to designate the same or similar components. Furthermore, in the following description, when it is determined that detailed descriptions of well-known functions related to the present invention and configurations thereof would make the gist of the present invention obscure, they will be omitted.

A routing device and method according to embodiments of the present invention will be described in detail below with reference to the accompanying drawings.

Figure 1:
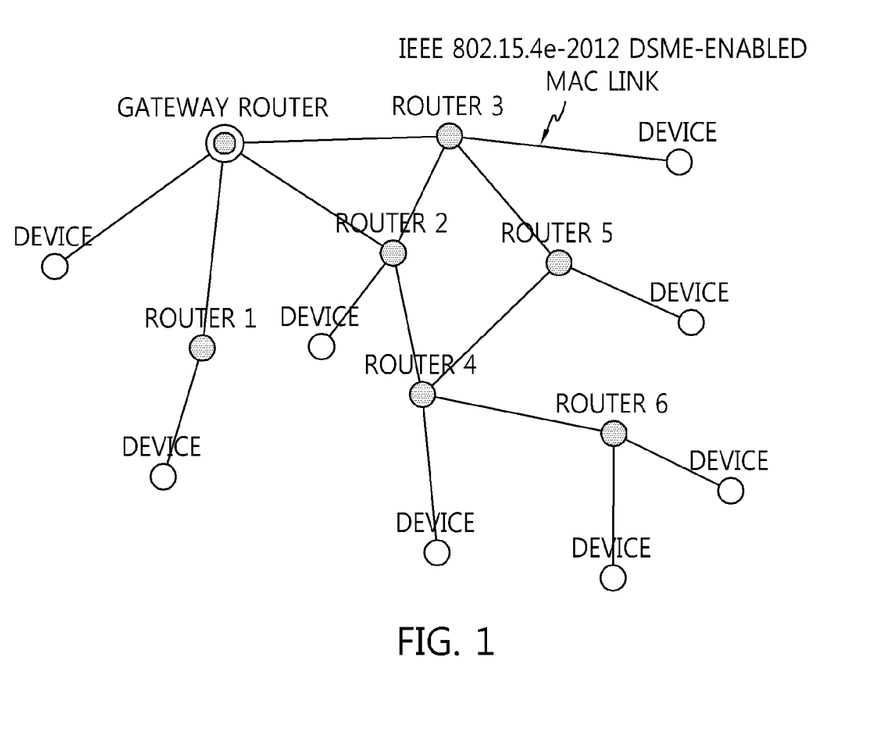
FIG. 1 is a diagram illustrating an LPWMN topology.

FIG. 1 is a diagram illustrating a Low Power Wireless Mesh Network (LPWMN) topology.

An LPWMN is a reliable low-cost communication network.

A low-power wireless network is configured by taking into consideration the limited transport distance of a device and link instability attributable to a change in a wireless environment.

Furthermore, a low-power wireless network is configured by taking into consideration the minimization of transmission and reception activation time for low-power operation and the minimization of transmission and reception messages for the configuration and maintenance of the wireless network.

Accordingly, an LPWMN is configured as a network that provides various quality grades that satisfy a limit condition.

Referring to FIG. 1, the LPWMN includes one or more devices, one or more routers, and at least one gateway router. However, the present invention is not limited thereto. The routers, the gateway router, and the devices may operate based on IEEE Std. 802.15. 4e-2012.

Furthermore, the LPWMN may include a Deterministic and Synchronous Multi-channel Extension (DSME) MAC sublayer. The DSME Media Access Control (MAC) sublayer may be based on IEEE Std. 802. 15. 4e-2012.

The gateway router configures the attributes of a link network and then starts networking. Furthermore, the gateway router forms a link network topology, and connects the wireless mesh network to an external network.

Furthermore, the gateway router may operate as a PAN coordinator based on IEEE 802.15.4-2011 and IEEE Std. 802. 15. 4e-2012 in the MAC sublayer.

The router joins the link network. Furthermore, the router forwards frames through a DSMC MAC link.

The router may operate as a coordinator.

Each of the device may operate as a Reduced Function Device (RFD) or a Full Function Device (FDD). The RFD or FFD may be based on IEEE Std. 802.15.4-2011 and IEEE Std. 802. 15. 4e-2012. Furthermore, the device performs an application.

Referring to FIG. 1, the LPWMN operates as a star topology and a peer-to-peer topology.

In general, the device is connected to the router in a star topology. Furthermore, the device may be an initiation point or a termination point in the link network communication.

The gateway router is a major controller in the LPWMN. Furthermore, the gateway router and the routers may form a peer to peer topology.

A link network address is assigned by a cluster group.

An LPWMN according to an embodiment of the present invention will be described with reference to FIGS. 2 to 7 below.

Figure 2:
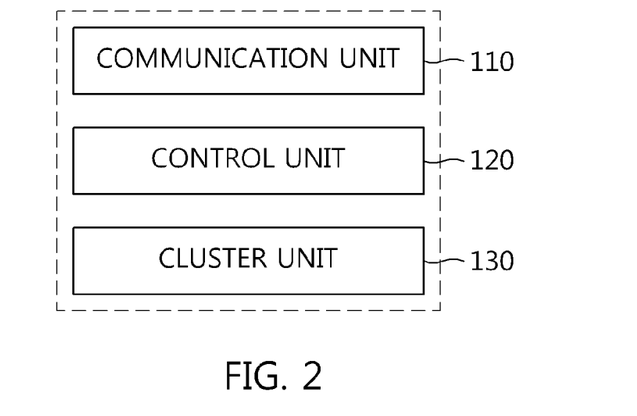
FIG. 2 is a block diagram of a router according to an embodiment of the present invention.

FIG. 2 is a block diagram of a router according to an embodiment of the present invention.

The router according to an embodiment of the present invention includes a communication unit 110, a control unit 120, and a cluster unit 130.

The communication unit 110 forwards data to a device, another router or a device connected to the communication unit based on a link.

The control unit 120 controls the overall operation of the router. The control unit 120 performs link control.

The cluster unit 130 configures a cluster tree, and assigns a cluster address. Furthermore, the cluster unit 130 configures information about a mesh link between devices within a cluster.

Figure 3:
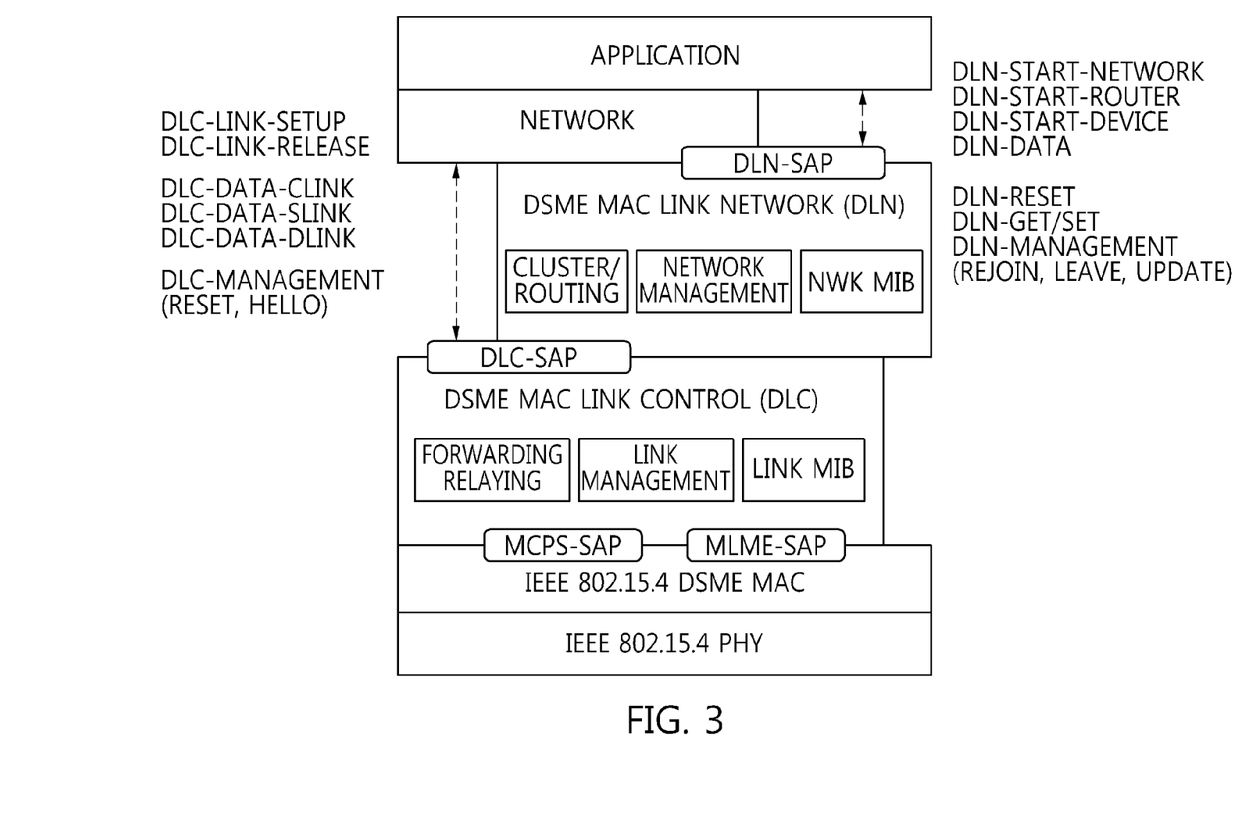
FIG. 3 is a diagram illustrating the functional configuration of an LPWMN according to an embodiment of the present invention.

FIG. 3 is a diagram illustrating the functional configuration of an LPWMN according to an embodiment of the present invention.

A router according to this embodiment of the present invention operates based on the layer illustrated in FIG. 3.

The control unit 120 of the router according to this embodiment of the present invention operates based on the next higher layer of a link control layer. Furthermore, the control unit 120 according to this embodiment of the present invention provides a link network layer interface with a next higher layer or an application layer.

The control unit 120 according to this embodiment of the present invention operates on the DSME MAC sublayer of IEEE Std. 802.15.4e-2012 and the physical (PHY) layer of IEEE Std. 802.15.4-2011.

The control unit 120 according to an embodiment of the present invention may operate based on two sublayers. The two sublayers, that is, a basis for the operation of the control unit 120 according to this embodiment of the present invention, may include a DSME MAC Link Control sublayer (DLC) and a DSME MAC Link Network sublayer (DLN).

A DSME MAC Link Control sublayer Entity (DLCE) provides service to a next higher layer through a DLC-Service Access Point (SAP).

A DSME MAC Link Network sublayer Entity (DLNE) provides service to a next higher layer through a DLN-SAP.

The DLC provides link connection control, link management service, and data transmission on a link. The control unit 120 performs link connection control, link management service, and data transmission on a link based on the DLC.

Furthermore, the DLC may relay frames along with the support of the DSME MAC sublayer via a MAC Common Part Sublayer (MCPS)-SAP and an MAC Layer Management Entity (MLME)-SAP.

The DLN includes a link network formation block, an addressing block, a routing block, a link network management block, and a data processing block.

The data processing block provides a receiving function and a forwarding function that are used to receive a frame from the MAC layer or receive data from a next higher layer.

The control unit 120 provides functions, such as the link initialization of a router, the configuration of the shared link of a channel hopping time multiplexing link in a higher layer having a network protocol, the configuration of a dedicated link, un-ack-based frame transfer, ack-based frame transfer, frame relaying on a dedicated link based on the DLN.

Furthermore, the DLN maintains information about the beacon and channel hopping offset occupation state information of an adjacent device of a 1-hop inner router, the beacon and channel hopping offset occupation state information of an adjacent device of a 1-hop outer router, and the beacon and channel hopping offset occupation state information of an adjacent device of the DLN. The DLN sets a beacon and a channel hopping offset for a router that requests new joining.

The DLN provides a link layer network function to a higher layer having no network function.

Depending on the settings of a device, the PAN coordinator resets the LPWMN based on the DLN and then manages network resources. Furthermore, the PAN coordinator configures a cluster in accordance with a tree cluster structure, and assigns an address to a router.

The control unit 120 collects information about adjacent networks based on the DLN, and the control unit 120 is assigned an address, a superframe for the generation of a beacon and a channel hopping offset with the help of an inner router.

The control unit 120 manages periodic cluster mesh link information, shared link path information, and dedicated link path information, maintains a routing table, and provides frame routing.

The control unit 120 is assigned an address by a higher router based on the DLN, and the control unit 120 sets up a shared link. The DLN provides a higher layer with three frame transfer methods, including un-ack-based transfer, ack-based transfer, and path connection method transfer.

Figure 4:
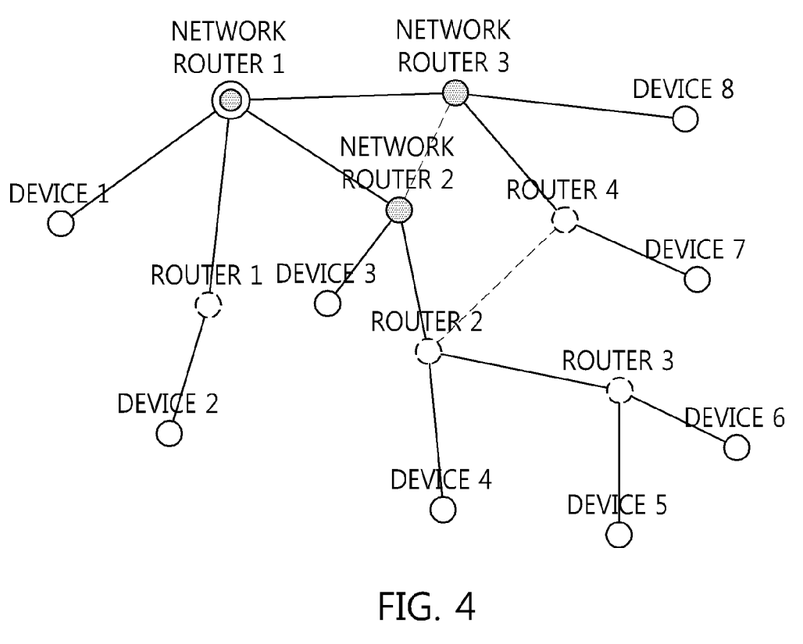
FIG. 4 is a diagram illustrating an LPWMN topology according to an embodiment of the present invention.

FIG. 4 is a diagram illustrating an LPWMN topology according to an embodiment of the present invention.

Furthermore, FIG. 4 illustrates links generated in a network layer when a link layer multi-hop connection is provided in an LPWMN based on a channel hopping time multiplexing link.

The LPWMN according to this embodiment of the present invention includes one or more devices, one or more routers, at least one gateway router, and one or more link network routers. A network router 1 may be the gateway router. However, the present invention is not limited thereto. The present invention may be applied to an LPWMN from which one or more components have been omitted. Although eight devices 1 to 8, four routers 1 to 4, two network routers 2-3, and a single gateway router have been illustrated in FIG. 4, the present invention is not limited thereto.

Each of the routers may connect a device to a network router. Alternatively, the router may connect a device to another router. Alternatively, the router may connect a device to a gateway router.

The control unit 120 performs link control and sends data to a device or a router with which a link has been set up through the communication unit 100. The control unit 120 sets up a link between a router and a device connected to the router.

In accordance with an embodiment of the present invention, the control unit 120 may generate a link as a virtual link, a shared link, or a dedicated link.

A virtual link according to an embodiment of the present invention may be a multi-hop link that is connected through a router that relays a routed transport frame instead of forwarding the routed transport frame.

When a device initially sets up a wireless link in order to join a network in the LPWMN based on a channel hopping time multiplexing link, one or more devices, routers and network routers included in the wireless mesh network configure a shared link by assigning two time slots for an inward transmitter (tx) and receiver (rx) for a wireless link. Although a router will be described as an example below, the following description of the router may also be applied to a device, a link network router and a gateway router unless described otherwise.

If the device requests a fixed path between a specific device and the device after joining the network, the two devices are connected by a dedicated link whose path is recognized as one link in the network layer.

In FIG. 4, when a dedicated link between the network router 2 and the device 6 is set up, the router 2 and the router 3 relay a frame in the link layer without forwarding the frame in the network layer.

The control unit 120 of each of the router 2 and the router 3 placed between the network router 2 and the device 6 relays a frame in the link layer without forwarding the frame in the network layer.

That is, if a fixed path is formed between two devices with a router interposed between the two devices, the control unit 120 of the router relays a frame in the link layer without forwarding the frame in the network layer.

Figure 5:
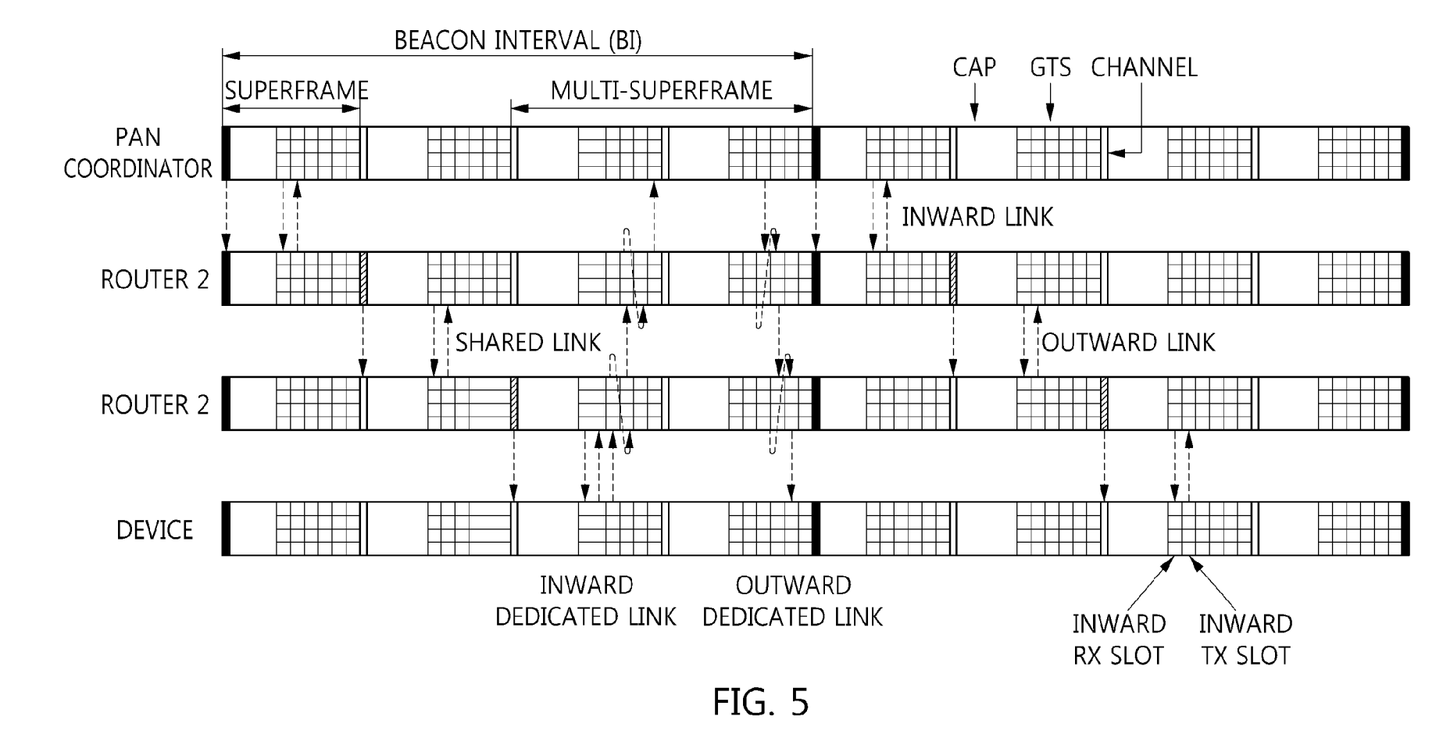
FIG. 5 is a diagram illustrating a CAP link, a shared link, and a dedicated link in an LPWMN according to an embodiment of the present invention.

FIG. 5 is a diagram illustrating a CAP link, a shared link, and a dedicated link in an LPWMN according to an embodiment of the present invention.

A link set up by the control unit 120 according to an embodiment of the present invention may be a wireless link based on IEEE 802.15.4e-2012 DSME MAC.

The wireless link based on IEEE 802.15.4e-2012 DSME MAC include superframes whose beacon interval (BI) between beacons has a contention access period (CAP) and a guaranteed time slot (GTS). One or more multi-superframes are included within the BI.

The CAP operates based on carrier sense multiple access-collision avoidance (CSMA-CA).

Furthermore, the CAP is used for the transmission of an outward MAC frame from a PAN coordinator to a device or the transmission of an inward MAC frame from a device to a PAN coordinator.

The GTS is assigned before its use so that it can be exclusively used between two devices on a wireless link, and is assigned for an inward tx or an outward tx.

The control unit 120 of the router can communicate with devices or routers within the same wireless region at the same time via a plurality of wireless channels available within a time slot.

The control unit 120 of the router shares a channel hopping sequence in order to assign channels that do not overlap each other between devices or routers within the same region. The control unit 120 of the router may assign different offsets to hopping sequence initiation points between devices or routers.

In an inward link, a PAN coordinator based on the router 2 and the superframe structure of the PAN coordinator between the routers 2 are constructed. A time slot is classified as an inward rx slot or an inward tx slot. An outward link is configured based on the superframe structure of the router 2 between the router 2 and the router 4 on the basis of the router 2. A time slot is classified as an outward tx slot or an outward rx slot.

When a device joins a PAN coordinator through a router on the LPWMN based on a channel hopping time multiplexing link, the control unit 120 should select a superframe required for the generation of the beacon of the router and a channel hopping offset so that the selected superframe and channel hopping offset do not collide with those of other routers.

Furthermore, the control unit 120 assigns a GTS in order to transfer a data frame so that the GTS does not collide with those of adjacent devices. The control unit 120 selects a wireless link to be used to transfer a frame from one device to another device, and configures a routing path.

Figure 6:
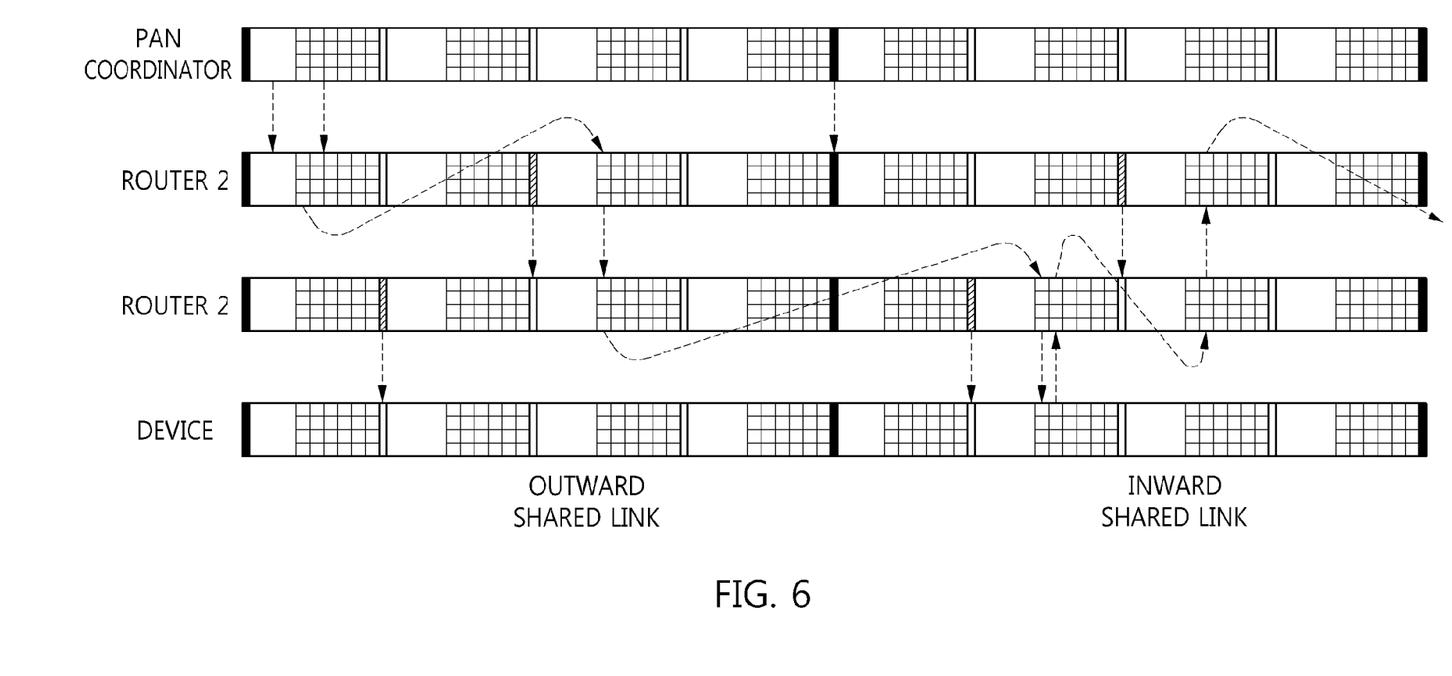
FIG. 6 is a diagram illustrating a shared link according to an embodiment of the present invention.

FIG. 6 is a diagram illustrating a shared link according to an embodiment of the present invention.

FIG. 6 illustrates the configuration of a shared link, an outward shared link frame transfer path from a PAN coordinator to a device along the shared link, and an inward shared link frame transfer path from a device to a PAN coordinator along the shared link.

If a new device joins a network and connects to a router, the control unit 120 of the router selects an adjacent router that is connected to a PAN coordinator through optimum routing, and sets up a shared link using a previously designated time slot between the adjacent router and the new device. Accordingly, the device that has joined the router or the router may have a path using the shared link up to the PAN coordinator.

In an embodiment of a default shared link, when the device joins a network, the CAP of a superframe in which the beacon of the inner coordinator is transferred is terminated, and then a first time slot is applied as an inward rx time slot that is used to send a frame from an inner coordinator to a device.

Furthermore, a second time slot is applied as an inward tx time slot that is used to send a frame from a device to an inner coordinator. A frame received in the tx time slot of the outward shared link of a PAN coordinator is transmitted in the tx time slot of the outward shared link of a router 1.

Referring to FIG. 6, a frame that is transmitted in the tx time slot of the inward shared link of the device is received in the rx time slot of the outward shared link of a router 2 and transmitted in the tx time slot of the inward shared link of the router 2. A transfer delay having a fixed value in a path based on the outward shared link and a transfer path based on the inward shared link is determined by the number of router layers and the transmission position of a router beacon.

Figure 7:
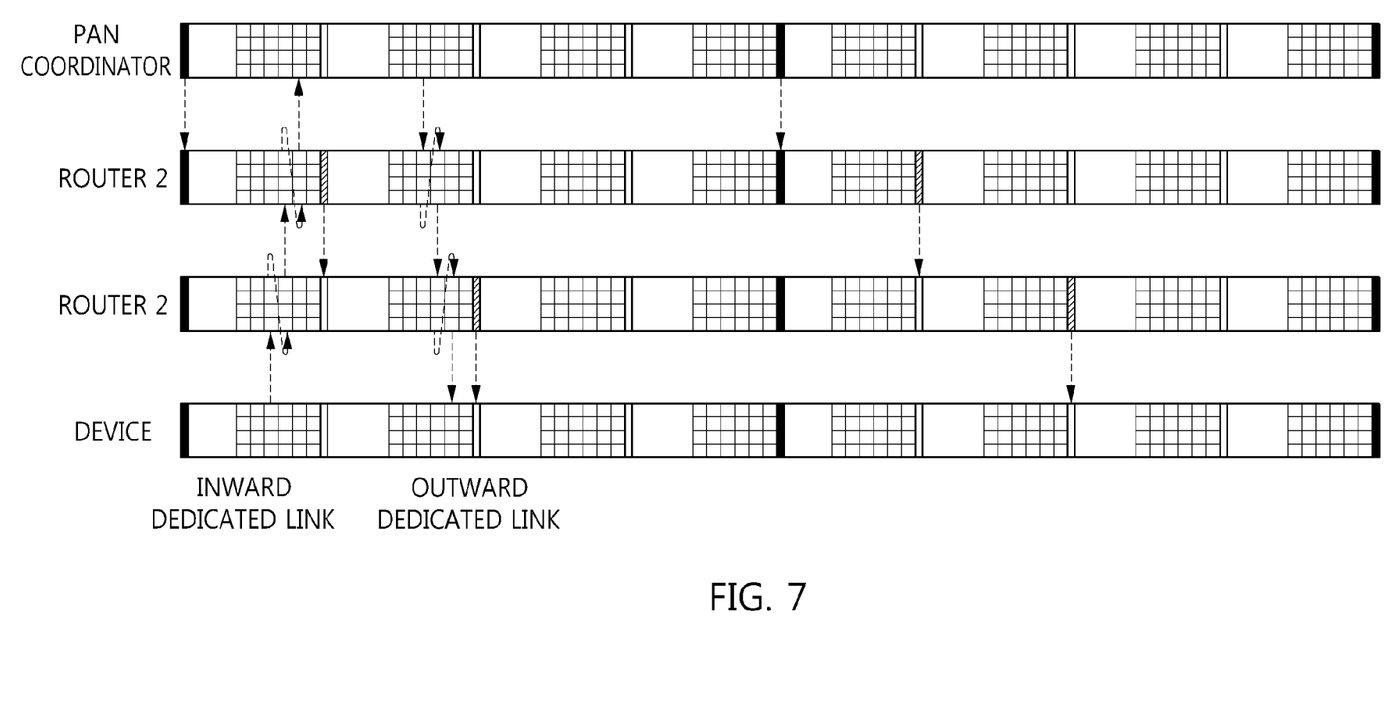
FIG. 7 is a diagram illustrating a dedicated link according to an embodiment of the present invention.

FIG. 7 is a diagram illustrating a dedicated link according to an embodiment of the present invention.

FIG. 7 illustrates a dedicated link connection between a PAN coordinator and a device through a router 1 and a router 2.

The control unit 120 sets up a dedicated link using a time slot that is exclusively assigned in order to transfer a frame between a specific device and another device.

The dedicated link starts to be set up from a link source device when the link source device designates a destination device. The source device selects an adjacent device connected to the destination device based on routing information, sets a time slot for an inward link, selects a next router based on the routing information of the adjacent device, and sets a time slot for the inward link.

If an inward path up to the destination device is set up as described above, an outward dedicated link up to the source device is set up by setting a time slot for the outward link for each router while inversely traversing the routers on the path from the destination device. A time slot for the inward dedicated link and a time slot for the outward dedicated link are assigned so that time slot resources within the network can be maximally utilized and inward and outward end-to-end delays can be minimized.

As an example, as in FIG. 7, the time slot of a dedicated multi-hop link may be sequentially assigned as a time slot within one superframe. The dedicated multi-hop link is used before a data frame is transferred and after a link layer has been set.

Figure 8:
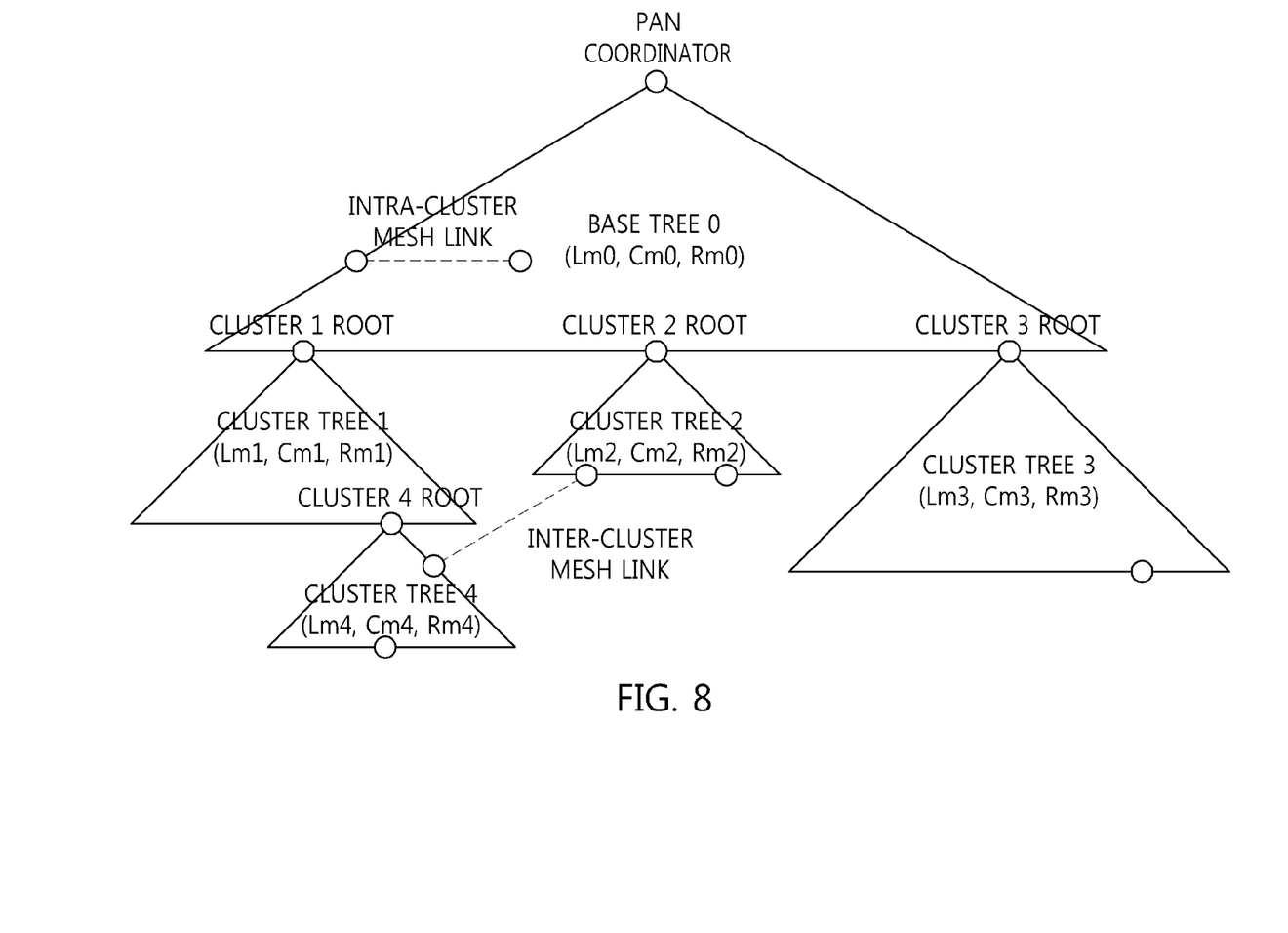
FIG. 8 is a diagram illustrating a cluster tree according to an embodiment of the present invention.

FIG. 8 is a diagram illustrating a cluster tree according to an embodiment of the present invention.

Figure 9:
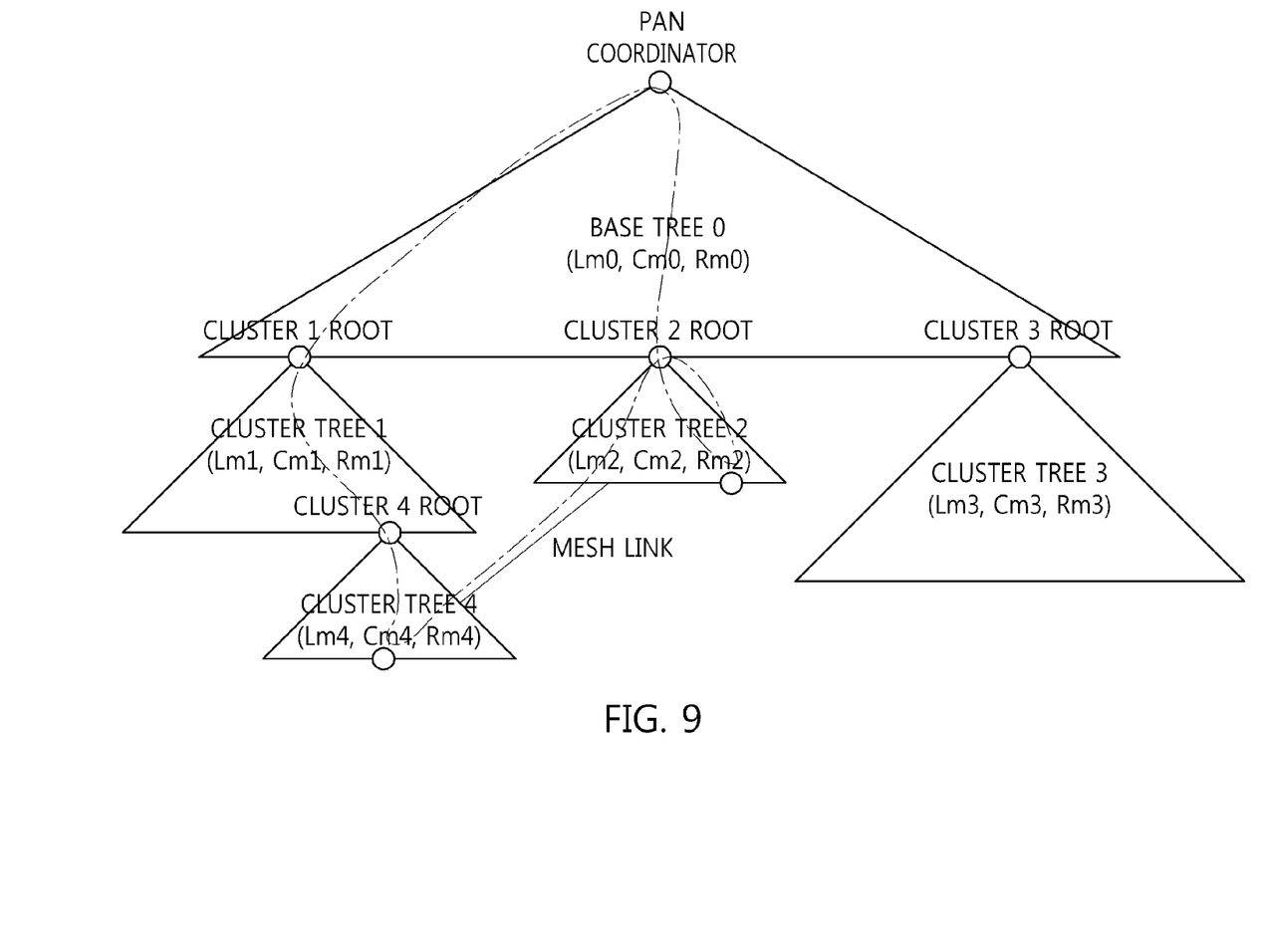
FIG. 9 is a diagram illustrating a cluster tree based on mesh routing according to an embodiment of the present invention.

FIG. 9 is a diagram illustrating a cluster tree based on mesh routing according to an embodiment of the present invention.

Referring to FIGS. 8 and 9, routers and devices within an LPWMN based on a channel hopping time multiplexing link are connected in the form of a cluster tree.

The cluster unit 130 of each of the routers assigns an address using a cluster ID, a position within the tree, a maximum depth Lm, the maximum number of children Cm, and the number of routers Rm.

The cluster unit 130 collects cluster configuration information, intra-cluster mesh link information, and inter-cluster mesh link information. The cluster unit 130 sends the collected information to the control unit 120 as routing information.

Upon setting up a dedicated link or routing a frame using a shared link, the control unit 120 determines routing based on routing information.

The control unit 120 determines routing using a path distance using a cluster mesh link, the reliability of the link, and load information.

As described above, the present invention provides links having various types of quality in a wireless network including a channel hopping time multiplexing wireless link. Accordingly, an address system capable of providing networking in a link layer instead of an Internet protocol in a private wireless network that is not connected to the Internet and a low-power routing device and method capable of configuring a low power mesh network can be provided.

Furthermore, in accordance with an embodiment of the present invention, a networking protocol, such as an Internet protocol, can be supported in a low power wireless mesh network including a channel hopping time multiplexing wireless link. Furthermore, if a network protocol is not present, a link layer network protocol can be provided. Accordingly, a reliable low-power wireless network based on a channel hopping time multiplexing wireless link can be provided.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A routing device for configuring a Low Power Wireless Mesh Network (LPWMN) including a channel hopping time multiplexing wireless link, the routing device comprising:
    a control unit configured to set up a shared link using an inward rx timeslot and an inward tx timeslot and a dedicated link to an external device, the dedicated link including an inward dedicated link and an outward dedicated link; and
    a communication unit configured to forward a data frame to the external device based on the set-up link
    wherein the shared link and the dedicated link comprise superframes whose beacon interval (BI) has a contention access period (CAP) and a guaranteed time slot (GTS), and a multi-superframe,
    wherein the routing device is addressed using a cluster tree,
    wherein the cluster tree corresponds to a cluster ID and the routing device is addressed using a position within the cluster tree,
    wherein the control unit is configured to set up a virtual link, wherein the virtual link comprises a multi-hop link connected through the routing device which relays a routed transport frame instead of forwarding the routed transport frame.

2. The routing device of claim 1, wherein the dedicated link corresponds to relaying a routed transport frame instead of forwarding the routed transport frame.

3. The routing device of claim 1, wherein the control unit operates based on a Deterministic and Synchronous Multi-channel Extension (DSME) MAC Link Control sublayer (DLC) and a DSME MAC Link Network sublayer (DLN).

4. The routing device of claim 3, wherein the control unit performs link connection control, link management service, and data transmission on a link based on the DLC.

5. The routing device of claim 4, wherein the control unit configures the shared link and the dedicated link based on the DLC.

6. The routing device of claim 3, wherein the DLN comprises a link network formation block, an addressing block, a routing block, a link network management block, and a data processing block.

7. The routing device of claim 6, wherein the control unit is assigned an address by a higher router based on the DLN, and selects a routing path of the virtual link, the shared link, or the dedicated link.

8. A routing method for configuring a Low Power Wireless Mesh Network (LPWMN) including a channel hopping time multiplexing wireless link, the routing method comprising:
setting up a shared link using an inward rx timeslot and an inward tx timeslot and a dedicated link to an external device, the dedicated link including an inward dedicated link and an outward dedicated link;
setting up a virtual link; and
forwarding a data frame to the external device based on the set-up link,
wherein the shared link and the dedicated link comprise superframes whose beacon interval (BI) has a contention access period (CAP) and a guaranteed time slot (GTS), and a multi-superframe,
wherein the external device is addressed using a cluster tree,
wherein the cluster tree corresponds to a cluster ID and a routing device is addressed using a position within the cluster tree,
wherein the virtual link comprises a multi-hop link connected through the routing device which relays a routed transport frame instead of forwarding the routed transport frame.

9. The routing method of claim 8, the dedicated link corresponds to relaying a routed transport frame instead of forwarding the routed transport frame.

10. The routing method of claim 8, wherein the setting up is performed based on a Deterministic and Synchronous Multi-channel Extension (DSME) MAC Link Control sublayer (DLC) and a DSME MAC Link Network sublayer (DLN).

11. The routing method of claim 10, wherein the DLC provides link connection control, link management service, and data transmission on a link.

12. The routing method of claim 11, wherein the setting up configures the shared link and the dedicated link based on the DLC.

13. The routing method of claim 10, wherein the DLN comprises a link network formation block, an addressing block, a routing block, a link network management block, and a data processing block.

14. The routing method of claim 13, wherein the control unit is assigned an address by a higher router based on the DLN, and the control unit sets a routing path of the virtual link and sets a routing path of the shared link and the dedicated link.

* * * * *